United States Patent [19]
Cross

[11] Patent Number: 6,009,156
[45] Date of Patent: Dec. 28, 1999

[54] METHOD FOR ACCOMMODATING MULTIPLE CALLING CARDS DURING A SINGLE CALL IN A TELECOMMUNICATIONS NETWORK

[75] Inventor: Wanda Kay Cross, Lynn Center, Ill.

[73] Assignee: Lucent Technologies Inc., Murray Hill, N.J.

[21] Appl. No.: 08/960,615

[22] Filed: Oct. 29, 1997

[51] Int. Cl.[6] .................................................. H04M 17/00
[52] U.S. Cl. ........................... 379/144; 379/112; 379/114
[58] Field of Search .............................. 379/91.01–91.02, 379/112–115, 143–144, 133–134, 120–121, 155, 127, 188–189, 196–198

[56] References Cited

U.S. PATENT DOCUMENTS

| | | | |
|---|---|---|---|
| 5,265,155 | 11/1993 | Castro | 379/144 |
| 5,408,519 | 4/1995 | Pierce et al. | 379/67 |
| 5,469,497 | 11/1995 | Pierce et al. | 379/144 |
| 5,577,109 | 11/1996 | Stimson et al. | 379/112 |
| 5,825,863 | 10/1998 | Walker | 379/144 |

FOREIGN PATENT DOCUMENTS

| | | | |
|---|---|---|---|
| 05012543 | 1/1993 | European Pat. Off. | G07F 7/08 |
| WO9312606 | 6/1993 | WIPO | H04M 11/00 |

OTHER PUBLICATIONS

U.S. application No. 08/526794, Cross et al., filed Sep. 11, 1995.

*Primary Examiner*—Paul Loomis
*Assistant Examiner*—Duc Nguyen
*Attorney, Agent, or Firm*—Mony R. Ghose

[57] ABSTRACT

A method for automatically billing multiple calling card accounts during a single call by an operator services system (OSS) is disclosed. Multiple calling card account numbers received in the OSS are validated and a maximum call duration is determined. Prior to balance depletion of all calling card accounts initially provided by the caller, the caller is notified of forthcoming balance depletion and subsequently given the option to bill the same call to other calling card accounts. While the caller is making alternate billing arrangements, network resources are held. After a predetermined amount of time, if no other billing arrangements have been made, the call is disconnected and the network resources are released.

8 Claims, 4 Drawing Sheets

| ANNOUNCEMENT TYPE | EXEMPLARY CONTENT |
|---|---|
| INITIAL PROMPT | "PLEASE ENTER YOUR CALLING CARD NUMBER OR ZERO FOR OPERATOR ASSISTANCE NOW." |
| CARD BALANCE QUOTATION | "YOU HAVE X DOLLARS AND Y CENTS. FOR THIS CALL, YOUR BALANCE WILL ALLOW YOU TO TALK FOR X HOURS AND Y MINUTES." |
| ADDITIONAL CARD PROMPT | "FOR ADDITIONAL CALLING TIME, PLEASE ENTER ANOTHER CALLING CARD NUMBER OR ENTER # TO PROCEED WITH YOUR CALL." |
| WARNING ANNOUNCEMENT | "TIME FOR THIS CALL WILL EXPIRE IN Z SECONDS. IF YOU WOULD LIKE TO EXTEND YOUR CALLING TIME FOR THIS CALL, PLEASE LISTEN FOR ADDITONAL INSTRUCTIONS AT THAT TIME." |
| COURTESY ANNOUNCEMENT | "PLEASE HOLD WHILE ADDITIONAL TIME IS ADDED TO THIS CALL." |
| DISCONNECT ANNOUNCEMENT | "PLEASE HANG UP. ADDITIONAL TIME WAS NOT SECURED FOR THIS CALL." |

METHOD FOR ACCOMMODATING MULTIPLE CALLING CARDS DURING A SINGLE CALL IN A TELECOMMUNICATIONS NETWORK

TECHNICAL FIELD

This invention relates to the field of telecommunications networks and, more particularly, to a method for efficiently billing multiple calling cards during a single call in such telecommunications networks.

BACKGROUND OF THE INVENTION

The U.S. telecommunications industry is evolving in anticipation of rigorous competition for market share in local and long distance services. It is competition, and the expectations of the modem day consumer, that drive telecommunications companies to quickly bring to market those products and services which provide competitive pricing, quality service and convenience. One example of such a service is the now familiar "calling card" which allows a subscriber to place toll calls while away from the home or office without having to bill the call to a third party or to continually insert coins into a public telephone. A typical calling card enables a user to dial a directory number of a called party and a calling card number to place a call. Upon validation of the dialed calling card number by an operator services system (OSS), a connection between the caller and the called party is established. The calling card subscriber subsequently pays for the telephone call, and all other calls placed during a predetermined period, upon receiving an itemized calling card bill. Alternatively, the calling card may carry a pre-established (i.e., prepaid) balance as described in the U.S. patent application of Wanda K. Cross et al. entitled "Method For Establishing Customized Billing Arrangements For A Calling Card In A Telecommunications Network", Ser. No. 08/526,794, filed Sep. 11, 1995, which is assigned to AT&T Corp. and incorporated by reference herein. Prepaid calling cards carry a non-billed balance enabling the user to place telephone calls using the number printed on the face of the card until the balance is depleted. As the balance nears depletion, the typical user contacts the issuing company for another prepaid card. Consequently, it is not unusual for a single user to retain multiple, prepaid calling cards with varying balances.

An inconvenience associated with retaining multiple, prepaid calling cards results from current network implementations which require callers to limit usage to one calling card account per call. In other words, if the remaining balance on a prepaid calling card is insufficient to allow a conversation of a desired length, the caller is forced to disconnect the call at calling card balance depletion and reoriginate the call with a different calling card. This process necessarily creates extra dialing for the caller as special access numbers, menu options, the new calling card number and called party's telephone number must be reentered before the call can be established again. Further, in addition to extra dialing, an interruption of the telephone conversation between the caller and called party is required. Since ease-of-use is the hallmark of any calling card service, inconveniences associated with prepaid calling card use may result in a loss of market share for calling card issuing companies. Therefore, there is a need in the art for accommodating multiple calling card billing of a single call in a telecommunications network.

SUMMARY OF THE INVENTION

This need is addressed and a technological advance is achieved in the telecommunications art by the method and

2 system of the present invention which enables an operator services system (OSS) to accommodate the billing of multiple, prepaid calling cards during a single call.

An OSS includes an internal database for storing announcements and is interconnected to a card validation database, a rating database, a billing system, and a customer services switch. When a calling card call is received in the OSS, the calling card number is used to access the card validation and rating databases to determine a maximum call duration and the remaining balance on the card. In the preferred embodiment of the present invention, the caller is provided with call duration and remaining balance information and given the option to add other calling card numbers (and their respective balances) to the billing arrangement for the call. If more than one calling card number is provided, each corresponding calling card account is sequentially decremented for the duration of the call. If the caller wishes to forego this option, the call is connected. Subsequently, at a predetermined warning time (e.g., 30 seconds prior to actual call termination), the caller is notified that the remaining balance on all provided calling card accounts is about to be depleted but the caller will have the opportunity to prolong the call. At the end of the warning period (that is, balance depletion), the caller is offered the option to bill the current call to another calling card number. The called party and network resources are put on hold during this process. If the caller fails to make alternate billing arrangements, the called party is directed to disconnect the call.

Advantageously, the caller need not disconnect an ongoing call and cause network release of call connections to establish alternate billing arrangements for the call. As a result, conveniences associated with prepaid calling cards use are enhanced and network resources are conserved.

BRIEF DESCRIPTION OF THE DRAWINGS

FIG. 3 is a table of exemplary announcements provided to callers and called parties by the telecommunications network of FIG. 1 in accordance with the preferred embodiment.

DETAILED DESCRIPTION

Figure 1:
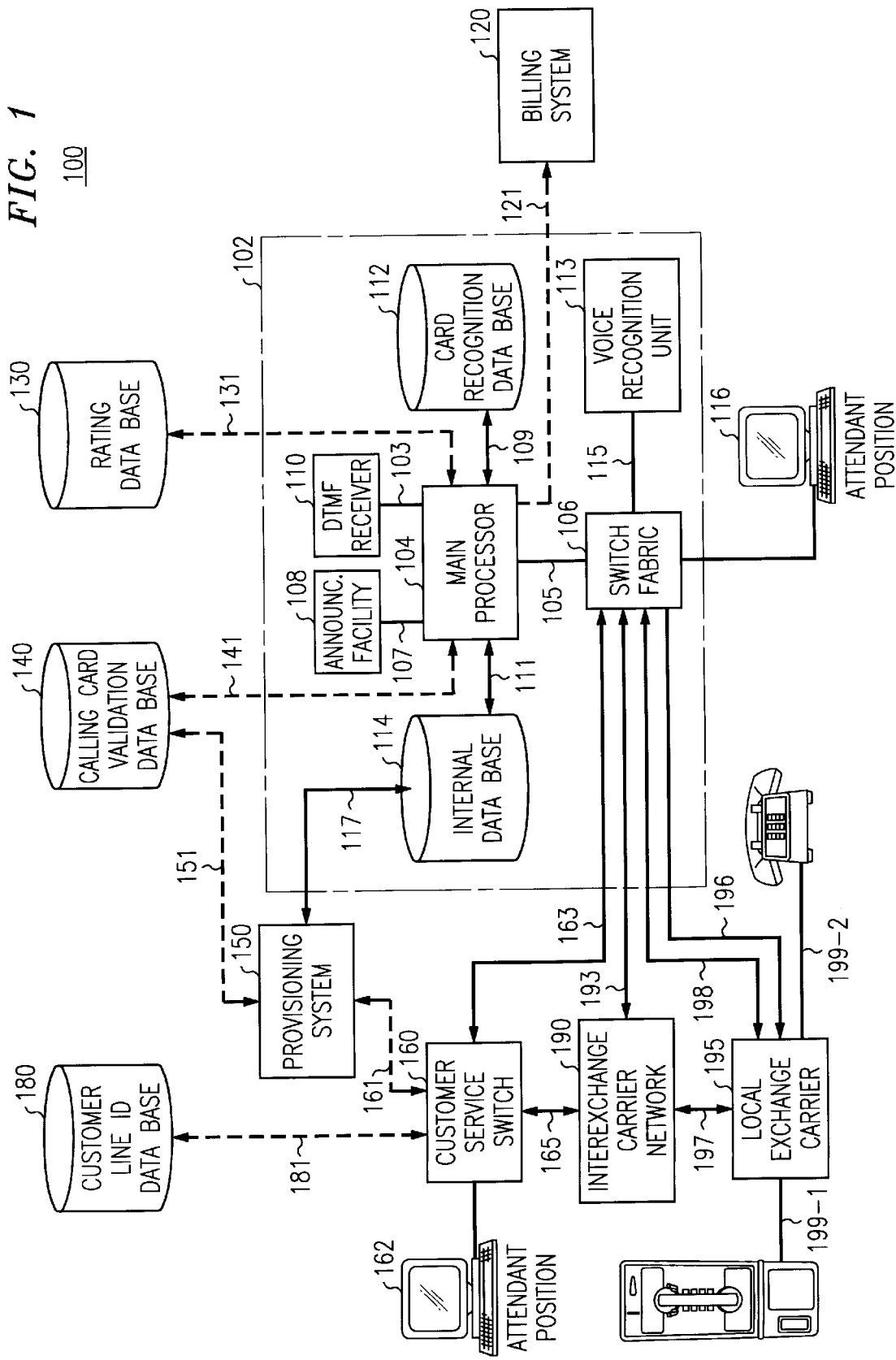
FIG. 1. is a simplified block diagram of a telecommunications network in which the present invention may be practiced.

FIG. 1 shows a preferred embodiment of a telecommunications network in which the present invention may be practiced. Particularly, telecommunications network 100 includes: operator services system (OSS) 102; billing system 120 capable of sequentially decrementing a plurality of validated calling card accounts during a single call; rating database 130; calling card validation database 140; provisioning system 150; customer service switch 160; customer line identification database 180; inter-exchange network 190; and local exchange carrier (LEC) network 195.

OSS 102 comprises main processor 104 for administering system-wide control functions interconnected, via system data link 105, to switch fabric 106. Switch fabric 106 serves as an interface between the system and other networks. Also interconnected to main processor 104, via system data link 107, is announcement facility 108 which stores and issues customized announcements in accordance with the method of the present invention, as described below. Dual tone multi-frequency (DTMF) receiver 110 is interconnected to processor 104 by data link 103 and is responsible for the reception and processing of a caller's dialed input. Card recognition database 112 communicates with processor 104 over data link 109 and stores a list of calling card vendor identifications. Internal database 114 is accessed by processor 104 via data link 111 for obtaining announcement protocols and generating billing data for transmittal to billing system 120. Attendant position 116 allows a human operator to serve as an interface between a caller and OSS 102, if necessary.

Calling card data is retrieved by OSS 102 from calling card validation database 140 over signaling link 141. In the preferred embodiment, calling card data includes remaining balance information Card validation database 140 is updated by provisioning system 150 which accesses the database by signaling link 151. Rate information is retrieved from rating database 130 via signaling link 131, and is used by OSS 102 to determine a maximum call duration for calls and the per minute decrement amount required for a particular call. Calling card customers who experience problems with their calling cards are forwarded to a customer representative posted at attendant position 116 of customer service switch 160 as known in the art. Periodically, calling card issuing companies may add prepaid non-billed balances to a card account to promote calling card use. This promotional balance is entered at the discretion of the card company by the customer representative into customer service switch 160. Customer service switch 160 is interconnected to: OSS 102 via bi-directional trunk 163; inter-exchange carrier network 190 via bi-directional trunk 165; and provisioning system 150 via signaling link 161. Customer service switch 160 also has access to customer line identification database 180 via signaling link 181.

Inter-exchange carrier network 190 receives calling card calls from a switch in a LEC network, such as LEC network 195, over bi-directional trunk 197. Particularly, inter-exchange carrier network 190 is accessed when a caller served by LEC network phone line 199-1 (or 199-2) dials a card company's toll-free access number, such as "1-800-555-CALL". Once the call is received in inter-exchange carrier network 190, it is extended over trunk 193 to OSS switch fabric 106. Alternatively, the caller may access switch fabric 106 directly from LEC network 195, via trunk 198, by simply dialing "0" plus a directory number.

Figure 2A:
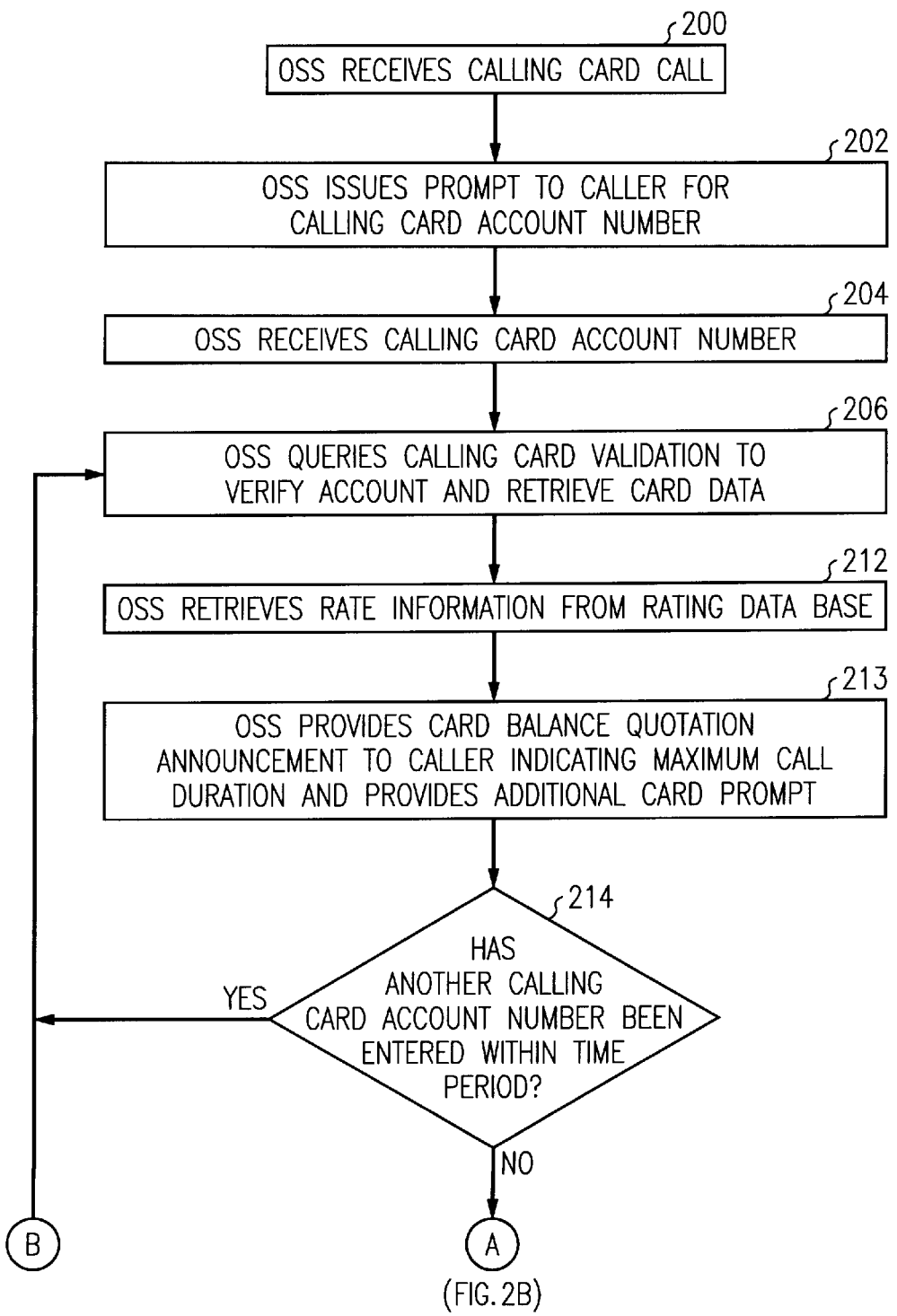
FIGS. 2A and 2B are flow diagrams illustrating the steps performed in the network of FIG. 1 in accordance with the preferred embodiment.
Figure 2B:
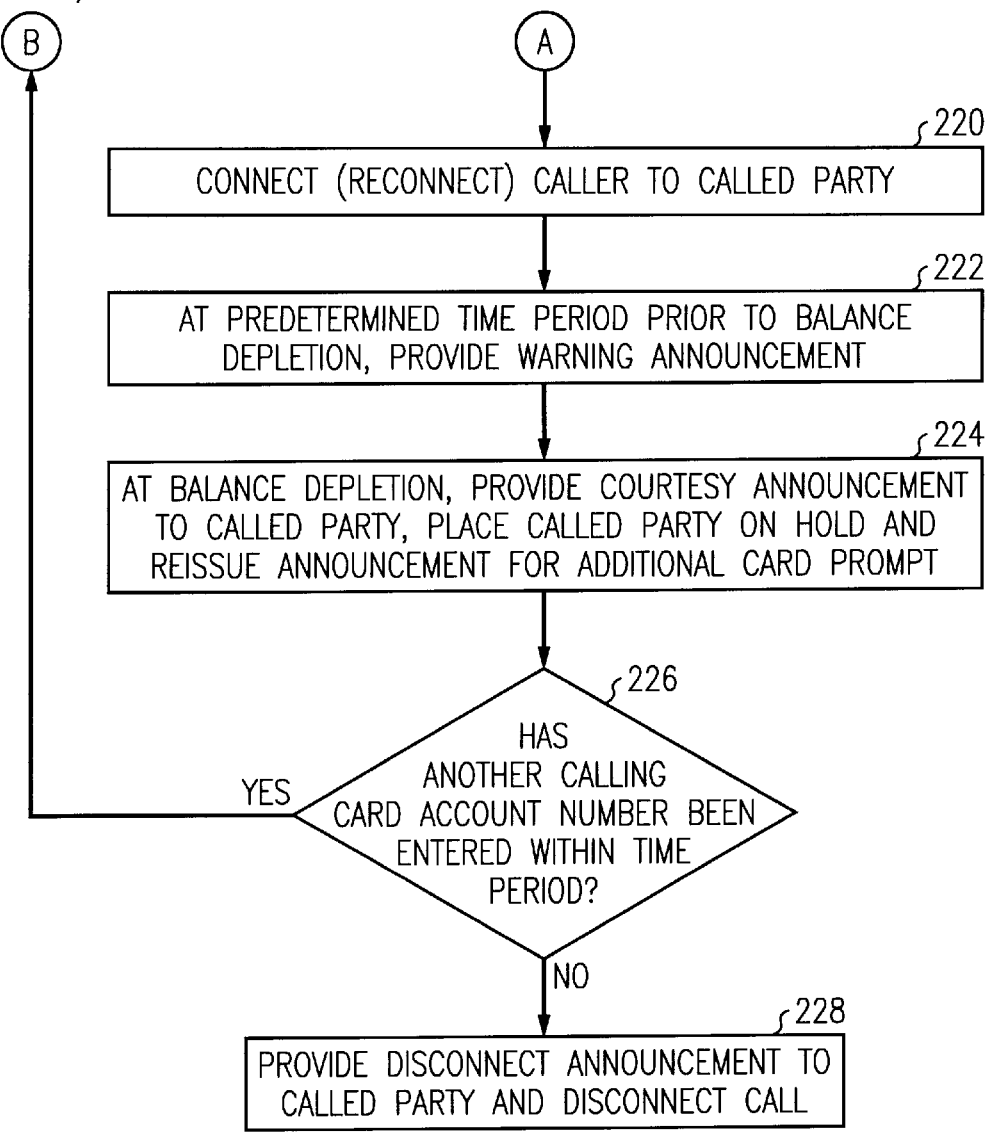

FIG. 2 is a flow diagram illustrating the steps performed in the telecommunications system of FIG. 1 for billing a single call to multiple calling card accounts. The process begins in step 200 when OSS switch fabric 106 receives a call from either interexchange carrier network 190 or LEC network 195. In step 202, OSS 102 prompts the caller for a calling card number by issuing a distinctive tone or an "initial prompt" announcement from announcement facility 108. An example of an initial prompt message is found in entry line 302 of Table 300 in FIG. 3 which states "Please enter your calling card number or zero for operator assistance now." The caller may key in a calling card number using a touch tone keypad located on the telephone or may provide a calling card number by speaking as known in the art. In step 204, OSS 102 receives the calling card number in DTMF receiver 110 or in voice recognition unit 119. If the caller is unable to provide the calling number by depressing digits on a keypad or speaking within a predetermined time period, an operator at attendant position 116 is connected to the caller by switch fabric 106 so that the calling card number can be received. In those embodiments in which the calling card number is received by an operator at attendant position 116, the operator also queries the caller for other calling card numbers.

The process continues to step 206 in which OSS main processor 104 uses the received calling card number for querying calling card validation database 140 for data associated with the card number. In this example, OSS 102 receives calling card data including the remaining balance associated with the card in step 206. In step 212, OSS 102 retrieves rate information from rating database 120 to calculate the maximum duration of the call as defined by the remaining balance on the card. In step 213, OSS 102 issues a "card balance quotation" announcement to the caller. An exemplary card balance quotation announcement is found in entry line 304 of FIG. 3 which informs the caller "You have X dollars and Y cents on this card. For this call, your balance will allow you to talk for X hours and Y minutes." In other words, the announcement provides the caller with the remaining balance and the maximum call duration that the remaining balance will allow. If multiple calling cards have been validated, the remaining balance associated with each calling card account is provided. The caller is then provided with an additional card prompt as in entry line 306 of FIG. 3 which informs the caller "for additional calling time, please enter another calling card number or enter # to proceed with your call."

In decision step 214, OSS determines whether another calling card number has been entered within a predetermined time period. If the outcome of decision step 214 is a "YES" determination, the process returns to step 206. Process steps 206 through 214 are repeated until the caller no longer adds calling card account numbers (that is, until the outcome of decision step 216 is a "NO" determination). If the outcome of decision step 214 is a "NO" determination, the process continues through connector A to FIG. 2B and step 220 in which the caller is connected (or reconnected if the called party had been put on hold while the caller entered another calling card account number, as described below) to the called party and billing system 120 is actuated to handle call billing as known in the art. As long as the caller remains interconnected to the called party, all validated calling card accounts identified by the caller are sequentially decremented by billing system 120. In step 222, OSS 102 determines if balance depletion is forthcoming (that is, if all calling card accounts are approaching a zero balance). Accordingly, at a predetermined time period prior to balance depletion, OSS 102 provides a warning announcement to the caller. This warning announcement indicates that balances associated with all provided calling card accounts are about to be depleted and that the caller should listen for other instructions at balance depletion. An exemplary warning announcement is found at entry line 310 of FIG. 3 which states "Time for this call will expire in Z seconds. If you would like to extend your calling time for this call, please listen for additional instructions at that time." The process continues to step 224 when, at balance depletion, OSS 102 provides a courtesy announcement to the called party, places the called party on hold and issues the additional card prompt (see FIG. 3, entry line 306) for billing the call to other calling card accounts. Network resources interconnecting the caller to the called party are held during the time when the caller is making alternate billing arrangements. An example of the courtesy announcement provided to the called party is found at entry line 312 of FIG. 3 which states "Please hold while additional time is added to this call." In decision step 226, OSS 102 determines whether the caller has entered another calling card account number within a predetermined amount of time. If the outcome of decision step 226 is a "YES" determination, the process returns through connector B to FIG. 2A and step 206 so that the newly entered calling card account number may be validated and the caller may be reconnected to the called party in step 220 as described above. If the outcome of decision step 226 is a "NO" determination, the process continues to step 228 in which the called party is provided with a disconnect call announcement such as in entry line 314 of FIG. 3 which states "Please hang up. Additional time was not secured for this call." Also in this step, network resources interconnecting the caller and called party are released. In alternative embodiments, the caller may stay on the line after the call has been disconnected to receive remaining balance information relating to calling card accounts used for the call.

Advantageously, the present invention allows calling card users who retain multiple calling card accounts with various balances to automatically bill more than one calling card during a single call. The automatic billing of multiple calling cards during a single call saves the calling card user from excessive dialing and enables the network to operate more efficiently. This is because call connections between a caller and a called party need not be torn down simply for billing purposes. In the preferred embodiment, calling card users may defer the choice to bill to multiple calling cards until balance depletion occurs. In this manner, a calling card user is given a variety of options and the conveniences associated with calling card use are enhanced. Although the present invention has been described with respect to an illustrative embodiment, those skilled in the art will recognize that numerous other arrangements may be devised without departing from the scope of the invention.

The invention claimed is:

1. In a telecommunications network comprising a system for processing calling card calls, a method for billing calling card accounts during a call comprises:

prompting a caller for calling card account information for multiple prepaid calling card accounts prior to connecting a call;

validating multiple prepaid calling card accounts using the calling card information received from the caller; and sequentially decrementing validated prepaid calling card accounts during the call.

2. The method of claim 1 further comprising the step of providing the caller with a warning announcement prior to balance depletion of all validated prepaid calling card accounts.

3. The method of claim 2 further comprising the step of:

providing the caller with an opportunity to enter another calling card account number upon balance depletion.

4. The method of claim 3 further comprising the step of:

holding network resources while the caller is provided with the opportunity to enter another calling card account number.

5. A telecommunications network comprises:

an operator services system (OSS) interconnected to a telephone network;

a card validation database interconnected to the OSS for validating calling card accounts;

a rating database interconnected to the OSS for determining a maximum call duration of a call placed by a caller using a particular calling card account;

means for prompting a caller for information about multiple prepaid calling card accounts prior to connecting a single call; and means for sequentially decrementing validated calling card accounts during the single call.

6. The telecommunications network of claim 5 further comprising announcement means for providing calling card information to a user of a calling card account.

7. In a telecommunications network capable of accommodating calling card billing, a method for billing a plurality of calling cards during a call comprises:

prompting a caller for multiple prepaid calling card account numbers prior to connecting a first call;

validating received calling card account numbers; and sequentially decrementing validated calling card accounts during the first call.

8. The method of claim 7 further comprising:

providing calling card balance information to callers.

* * * * *